US012427636B2

(12) United States Patent
Zheng et al.

(10) Patent No.: US 12,427,636 B2
(45) Date of Patent: Sep. 30, 2025

(54) NOISE REDUCTION NAILER AND SPEED ADJUSTING ASSEMBLY THEREOF

(71) Applicants: Bluepoint Fasteners Inc., Chino Hills, CA (US); Yibin Heheng Technology Co., Ltd., Yibin (CN)

(72) Inventors: Weidong Zheng, Sichuan Province (CN); Wenhong Du, Sichuan Province (CN); Chao Wang, Yunnan Province (CN); Fangyi Wang, Chongqing (CN)

(73) Assignees: Blue Point Fastening Inc., Chino Hills, CA (US); Yibin Heheng Technology Co., LTD., Yibin (CN)

( * ) Notice: Subject to any disclaimer, the term of this patent is extended or adjusted under 35 U.S.C. 154(b) by 0 days.

(21) Appl. No.: 18/676,106

(22) Filed: May 28, 2024

(65) Prior Publication Data

US 2024/0308043 A1 Sep. 19, 2024

Related U.S. Application Data

(63) Continuation-in-part of application No. 17/585,185, filed on Jan. 26, 2022, now abandoned.

(30) Foreign Application Priority Data

Jan. 27, 2021 (CN) ......................... 202120220354.2

(51) Int. Cl.
*B25C 1/14* (2006.01)

(52) U.S. Cl.
CPC ..................................... *B25C 1/14* (2013.01)

(58) Field of Classification Search
CPC ........................................................ B25C 1/08
See application file for complete search history.

(56) References Cited

U.S. PATENT DOCUMENTS 3,268,013 A * 8/1966 Sussman .................. B25C 1/02 173/124
3,652,003 A * 3/1972 Leonardo ............... B25C 1/105 227/8
4,199,014 A * 4/1980 Nickle .................. B25B 23/045 206/338

(Continued)

FOREIGN PATENT DOCUMENTS

CN 210414410 U 4/2020

*Primary Examiner* — Thomas M Wittenschlaeger
*Assistant Examiner* — Katie L Gerth
(74) *Attorney, Agent, or Firm* — Ryan Dean; Umberg Zipser LLP

(57) ABSTRACT

A noise reduction nailer and a speed adjusting assembly are described. The speed adjusting assembly may comprise a power level adjust screw and a speed adjusting member matched with it. The speed adjusting member comprises a snap ring and a locate ring fixed on the snap ring. Slots with different heights are uniformly provided on a side wall of the locate ring. The power level adjust screw is composed of two speed adjusting rings with different diameters. A bulge is provided on an inner side wall of the large-diameter speed adjusting ring and the large-diameter speed adjusting ring is adapted to the locate ring. The speed adjusting assembly can adjust the shooting power of the nailer for different base bodies, and can use a steel ball to act on a small head cone of a piston to automatically reset the piston.

10 Claims, 8 Drawing Sheets

(56) References Cited

U.S. PATENT DOCUMENTS

| | | | | | |
|---|---|---|---|---|---|
| 5,452,836 | A * | 9/1995 | Huitema | A61B 17/072 227/176.1 |
| 5,810,240 | A * | 9/1998 | Robertson | A61B 17/072 227/176.1 |
| 6,581,815 | B1 * | 6/2003 | Ho | B25C 1/008 227/8 |
| 7,474,025 | B1 * | 1/2009 | Cheng | H02K 7/083 310/90 |
| 9,694,643 | B2 * | 7/2017 | Mersmann | B60G 17/005 |
| 9,835,404 | B2 * | 12/2017 | Shen | F41B 11/642 |
| 2011/0198383 | A1 * | 8/2011 | Masas | B25C 1/10 227/156 |
| 2012/0305624 | A1 * | 12/2012 | Liao | B25C 1/188 227/142 |

* cited by examiner

NOISE REDUCTION NAILER AND SPEED ADJUSTING ASSEMBLY THEREOF

This application is a continuation-in-part application of U.S. non-provisional patent application Ser. No. 17/585,185, filed on Jan. 26, 2022, which itself claims priority to China patent application no. 202120220354.2 filed on Jan. 27, 2021. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is fastening equipment, and specifically relates to a noise reduction nailer and a speed adjusting assembly thereof.

BACKGROUND

The following description includes information that may be useful in understanding the present invention. It is not an admission that any of the information provided herein is prior art or relevant to the presently claimed invention, or that any publication specifically or implicitly referenced is prior art.

A nailer is a tool that uses a power source such as a nail firing bullet, nitrocellulose or gas to burn the gunpowder in the bullet as the power, wherein a piston moves forward quickly to drive a nail into a base body such as steel and concrete for fastening.

Chinese Patent Application No. 201921268430.6 for utility model discloses a barrel of a silent type nailer and the nailer. The nailer cannot adjust the movement speed of the piston during use, resulting in a small range of use. Moreover, depending on the material of the base body, the power of the nail into the base body is different. If the power is too strong, the base body may be damaged; and if the power is too small, the nail may not be completely shot into the base body. Therefore, there is an urgent need for a nailer capable of performing power adjustment.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

In view of the shortcomings of the prior art, the inventive subject matter provides a noise reduction nailer and a speed adjusting assembly thereof, which can adjust the shooting power of the nailer for different base bodies, and at the same time, can use a steel ball to act on a small head cone of a piston to automatically reset the piston.

In order to achieve the above objective, the inventive subject matter is achieved by the following technical solution.

Disclosed in the inventive subject matter is a speed adjusting assembly of a nailer, comprising a power level adjust screw and a speed adjusting member matched with it, wherein the speed adjusting member comprises a snap ring and a locate ring fixed on the snap ring; slots with different heights are uniformly provided on a side wall of the locate ring; the power level adjust screw is composed of two speed adjusting rings with different diameters; a bulge is provided on an inner side wall of the large-diameter speed adjusting ring; and the large-diameter speed adjusting ring is adapted to the locate ring.

Preferably, the slots with different heights have the same thickness, and the slots are divided into a first slot with a height less than half of a height of the locate ring, a second slot with a height greater than half of the height of the locate ring, and a third slot with a height equal to the height of the locate ring.

Preferably, the height of the large-diameter speed adjusting ring is equal to the height of the locate ring.

Preferably, a thickness of the slots is equal to a thickness of the bulge, and the bulge is along the slots with different heights, so that the locate ring is inserted into the large-diameter speed adjusting ring.

Preferably, an outer diameter of the snap ring is the same as an outer diameter of the small-diameter speed adjusting ring.

Correspondingly, a noise reduction nailer comprises a barrel and a fastener guide assembly screwed to the barrel, wherein a reset ring toward the fastener guide assembly is provided in the barrel; a fastener guide with one end clamped with the reset ring is provided in the fastener guide assembly; a piston extending through the reset ring into the fastener guide is provided in the barrel; the other end of the fastener guide extends out of the fastener guide assembly and is screwed with an outer cover; and the speed adjusting assembly is sleeved on the fastener guide assembly between the outer cover and the barrel.

Preferably, a reset spring is sleeved on the fastener guide between the reset ring and the fastener guide assembly; a stopper is provided on an inner wall of the barrel; the reset ring abuts on the stopper; and one end of the fastener guide is a T-shaped head, and the reset ring is adapted to the T-shaped head, so that one end of the fastener guide is clamped in the reset ring.

Preferably, the speed adjusting assembly comprises a power level adjust screw and a speed adjusting member matched with it; the speed adjusting member comprises a snap ring and a locate ring fixed on the snap ring; slots with different heights are uniformly provided on a side wall of the locate ring; the power level adjust screw is composed of two speed adjusting rings with different diameters; a bulge is provided on an inner side wall of the large-diameter speed adjusting ring; the large-diameter speed adjusting ring is adapted to the locate ring; a ring bump is provided on a side wall of the fastener guide assembly; the snap ring and the speed adjusting ring are separately sleeved on the fastener guide assembly; the ring bump is clamped on a step surface where the snap ring and the locate ring are connected; an end surface of the small-diameter speed adjusting ring is opposite to an end surface of the outer cover; and the locate ring corresponds to the large-diameter speed adjusting ring.

Preferably, a positioning ferrule assembly for positioning the fastener guide assembly is provided in a circumferential direction of the outer cover; the positioning ferrule assembly comprises a through hole provided in the circumferential direction of the outer cover; a first ball and a first spring are provided in the through hole in order from inside to outside; a limit cover is provided in the through hole and located above the first spring; and the first ball extends into the outer cover and is located in an annular groove provided on a side wall of the fastener guide assembly.

Preferably, a limiting member for limiting the piston is provided in the circumferential direction of the fastener guide; the limiting member comprises a limiting hole provided in the circumferential direction of the fastener guide; a second ball is provided in the limiting hole; a spring leaf is provided in the limiting hole and located above the second ball; and the second ball is partially located in the fastener guide to limit the piston.

The inventive subject matter described herein has the following beneficial effects:

1. In the inventive subject matter, the speed adjusting assembly is provided on the nailer, so as to realize the adjustment of the power of the nailer. Specifically, the speed control assembly comprises a power level adjust screw and a speed adjusting member; the speed adjusting member comprises a snap ring and a locate ring fixed on the snap ring; slots with different heights are uniformly provided on a side wall of the locate ring, and the power level adjust screw is composed of two speed adjusting rings with different diameters; and a bulge is provided on an inner side wall of the large-diameter speed adjusting ring. The bulge can be clamped to the slots with different heights to adjust the size of the space between the large-size end of the piston and the air inlet of the barrel to achieve power adjustment, thereby realizing the use of different powers to shoot on the base bodies with different materials, and avoiding the problem that the base body is damaged or the nail cannot be completely shot into the base body due to the shooting power being too large or too small.
2. The inventive subject matter combines the speed adjusting assembly and the noise reduction nailer, so that the nailer can not only adjust the shooting power during use, but also achieve noise reduction during use. That is, the inside of the barrel is divided into cavities with different inner diameters, so that the high-pressure gas after the explosion enters the large-diameter section from the small-diameter section, so as to relieve the pressure and achieve the purpose of noise reduction. At the same time, in addition to the nailer disclosed in the inventive subject matter, the speed control assembly disclosed in the inventive subject matter can be applied to other types of nailers.

Various objects, features, aspects, and advantages of the inventive subject matter will become more apparent from the following detailed description of preferred embodiments, along with the accompanying drawing figures in which like numerals represent like components.

Figure 1:
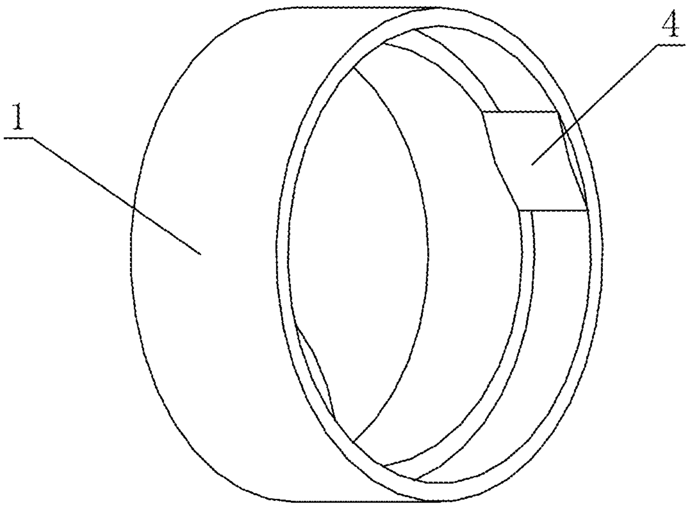
FIG. 1 is a structural schematic view of a power level adjust screw.
Figure 2:
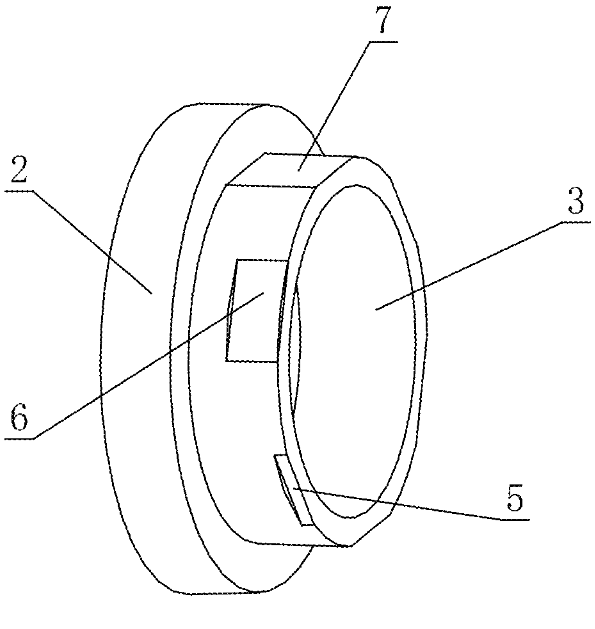
FIG. 2 is a structural schematic view of a speed adjusting member.
Figure 3:
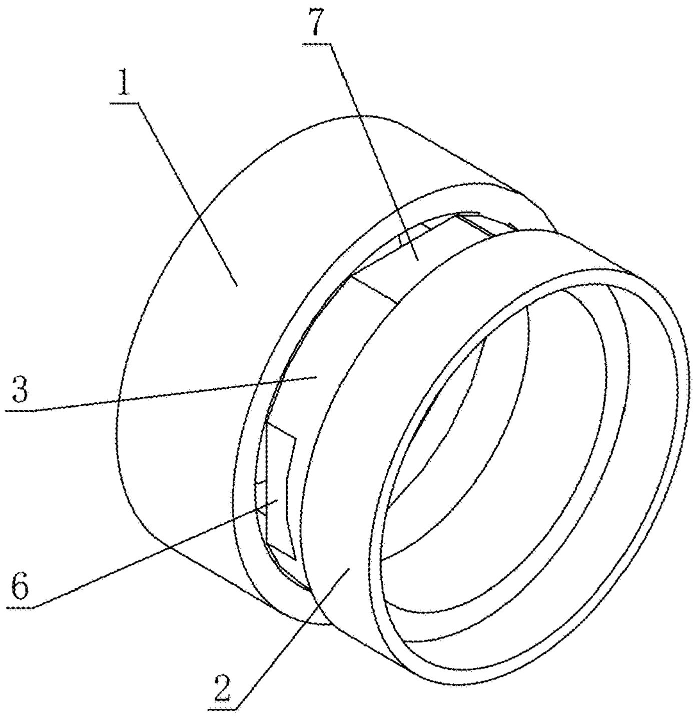
FIG. 3 is a view of a state where a bulge is clamped into a first slot.
Figure 4:
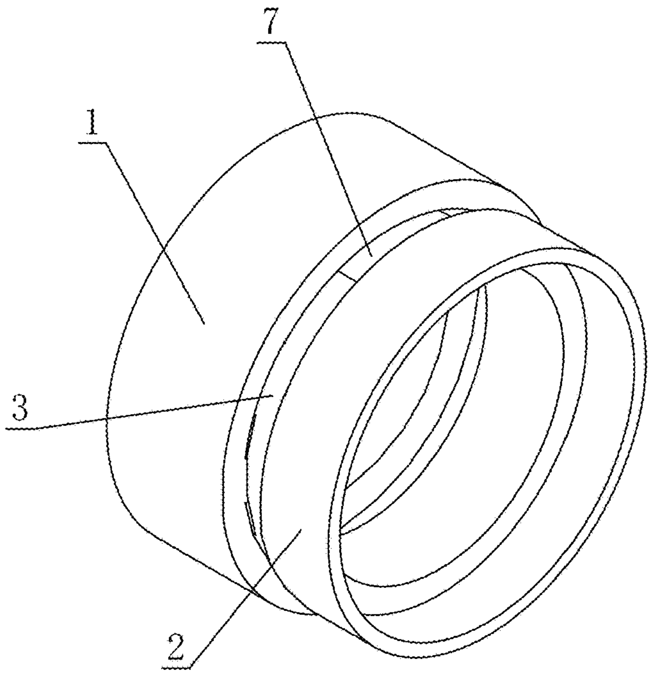
FIG. 4 is a view of a state where the bulge is clamped into a second slot.
Figure 5:
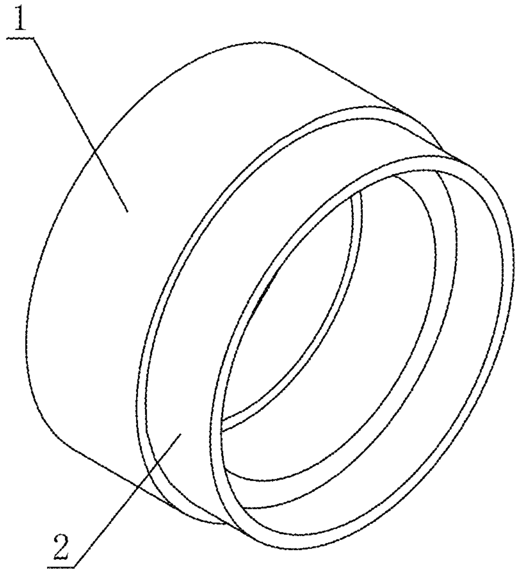
FIG. 5 is a view of a state where the bulge is clamped into a third slot.

In the Figures: power level adjust screw 1, snap ring 2, locate ring 3, bulge 4, first slot 5, second slot 6, third slot 7, barrel 8, fastener guide assembly 9, reset ring 10, fastener guide 11, piston 12, outer cover 13, reset spring 14, stopper 15, ring bump 16, first ball 17, first spring 18, limit cover 19, second ball 20, and spring leaf 21.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The technical solutions in the embodiments of the inventive subject matter will be clearly and completely described below with reference to the accompanying drawings. Obviously, the described embodiments are only a part of the embodiments of the inventive subject matter, and not all the embodiments. On the basis of the embodiments described herein, all other embodiments obtained by an ordinary person skilled in the art without involving inventive skill belong to the scope of protection of the inventive subject matter.

Unless otherwise specified, the technical means used in the implementation examples are conventional means well known to the person skilled in the art.

The inventive subject matter was further developed on the basis of Chinese Patent Application No. 201921268430.6 for utility model at the initial stage of research and development. The inner cavity of the barrel launch tube is divided into a first chamber, a second chamber, and a third chamber with different inner diameters, and a piston ring is provided in the circumferential direction of the large-size end of the pawl, so that the high-pressure gas generated by the high-temperature gunpowder is decompressed in the chambers with different inner diameters to achieve the purpose of noise reduction. However, the nailer disclosed in this patent cannot adjust the shooting power. Therefore, a speed adjusting assembly of a noise reduction nailer is disclosed in the inventive subject matter.

With reference to FIGS. 1 to 5, a speed adjusting assembly of a noise reduction nailer is disclosed in the inventive subject matter. The speed adjusting assembly comprises a speed adjusting nut 1 and a speed adjusting member matched with it. The speed adjusting member comprises a cover cap 2 and a sear holder return spring 3 fixed on the cover cap 2. The diameter of the cover cap 2 is larger than that of the sear holder return spring 3.

Firing pins assembly with different heights are uniformly provided on the side wall of the sear holder return spring 3, and the firing pins assembly with different heights have the same thickness. Specifically, the are divided into a first slot 5 with a height less than half of a height of the locate ring, a second slot 6 with a height greater than half of the height of the locate ring, and a third slot 7 with a height equal to the height of the locate ring.

The power level adjust screw 1 is composed of two speed adjusting rings with different diameters. A bulge 4 is provided on the inner side wall of the large-diameter speed adjusting ring. The large-diameter speed adjusting ring is adapted to the locate ring 3. The height of the large-diameter speed adjusting ring is equal to the height of the locate ring 3. The thickness of the firing pins assembly is equal to the thickness of the bulge 4, and the bulge 4 is along the firing pins assembly of different heights, so that the locate ring 3 is inserted into the large-diameter speed adjusting ring.

The outer diameter of the snap ring 2 is the same as the outer diameter of the small-diameter speed adjusting ring. It should be noted that the slots on the locate ring 3 can be provided in multiple groups, taking the first slot 5, the second slot 6 and the third slot 7 as one group. In this embodiment, two groups are preferably provided, and are provided symmetrically on the locate ring 3. The bulge 4 is preferably 1 or 2. In this embodiment, two bulges are preferably provided, and are provided symmetrically. When the locate ring 3 is inserted into the large-diameter speed adjusting ring, the bulges 4 are placed in the slots with different heights to realize the change of the length of the power level adjust screw and the speed adjusting member. For details, please refer to FIGS. 3 to 5.

Figure 6:
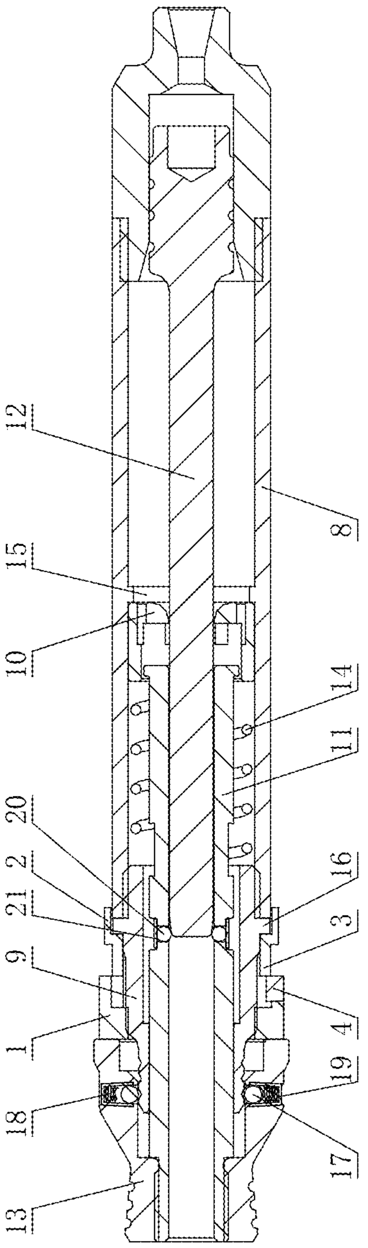
FIG. 6 is a structural schematic view where a speed adjusting assembly is assembled to a fastener guide assembly and the bulge is clamped into the first slot.
Figure 7:
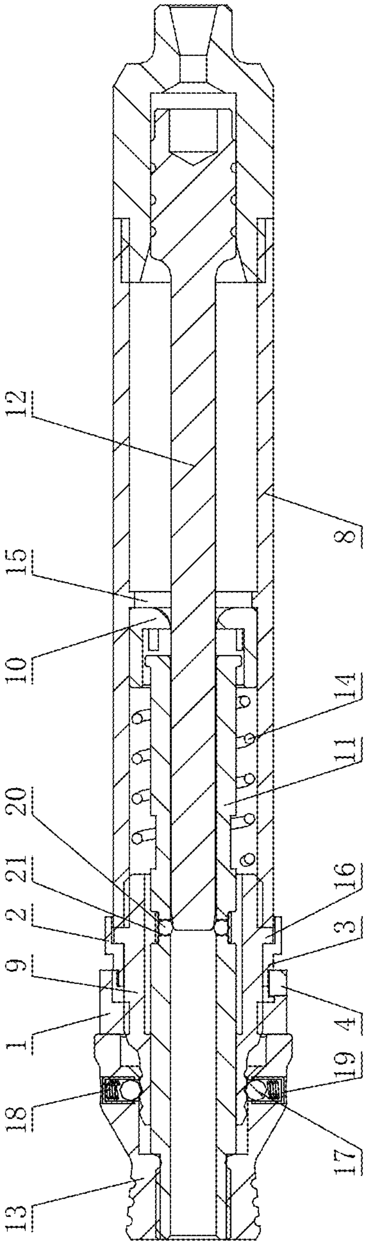
FIG. 7 is a structural schematic view where the speed adjusting assembly is assembled to the fastener guide assembly and the bulge is clamped into the second slot.
Figure 8:
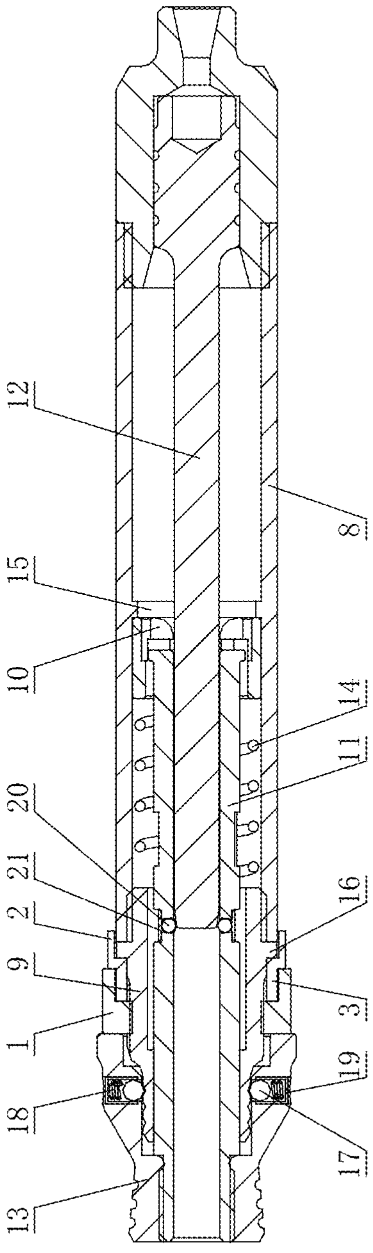
FIG. 8 is a structural schematic view where the speed adjusting assembly is assembled to the fastener guide assembly and the bulge is clamped into the third slot.

With reference to FIGS. 6 to 8, a launch assembly of a nailer is further disclosed in the inventive subject matter. The speed adjusting assembly disclosed above is installed on the launch assembly. Specifically, the launch assembly comprises a barrel 8 and a fastener guide assembly 9 screwed to the barrel 8. A ring bump 16 is provided on the side wall of the sear holder 9.

An external thread is provided on the side wall of the fastener guide assembly 16 between it and an end surface of the fastener guide assembly 9 at one end, and an internal thread is provided on the inner wall of the barrel 8, so that the barrel 8 and the fastener guide assembly 9 are fixed by means of threads.

A stopper 15 is provided on the inner wall of the barrel 8. A reset ring 10 opened toward the fastener guide assembly 9 is provided in the barrel 8 between the fastener guide assembly 9 and the stopper 15. The reset ring 10 abuts against the stopper 15. A fastener guide 11 with one end clamped with the reset ring 10 is provided in the fastener guide assembly 9. That is, the cross section of one end of the fastener guide 11 is a T-shaped head. The reset ring 10 is adapted to the T-shaped head, so that one end of the fastener guide 11 is clamped in the reset ring 10 and can be along the length direction of the barrel 8 in the cavity of the reset ring 10. A reset spring 14 is sleeved on the fastener guide 11 between the reset ring 10 and the fastener guide assembly 9 so that the fastener guide 11 returns to position after moving.

A piston 12 extending through the reset ring 10 into the fastener guide 11 is provided in the barrel 8. The side wall of one end of the piston 12 has a certain taper, that is, the diameter gradually decreases from a position of the piston 12 near the middle to the one end, and the other end is a large-size end. The large-size end faces an air inlet position of the barrel 8.

The inner diameter of the air inlet position of the barrel 8 is smaller than the inner diameter of the tube body of the barrel 8. The tapered end is limited by a limiting member provided in the circumferential direction of the fastener guide 11. The limiting member comprises limiting holes provided in the circumferential direction of the fastener guide 11. The limiting holes are located on the same plane. Preferably, there are two limiting holes, and they are symmetrically provided.

A second ball 20 is provided in the limiting hole, and a spring leaf 21 is provided in the limiting hole and located above the second ball 20. That is, the spring leaf 21 is provided in the limiting hole near the outside of the hole, and the second ball 20 is partially located in the fastener guide 11 and abuts against the inclined surface of the side wall of the piston 12, so as to limit the position of the piston 12.

Further, the other end of the fastener guide 11 extends out of the fastener guide assembly 9 and is screwed with an outer cover 13. That is, an internal thread is provided on the inner wall of the outer cover 13, and an external thread is provided on the outer side wall of the fastener guide 11, so that the fastener guide 11 is connected to the outer cover 13 by means of threads. The fastener guide 11 extends into the outer cover 13, and its end is flush with an end opening of the outer cover 13.

A speed adjusting assembly is sleeved on the fastener guide assembly 9 between the outer cover 13 and the barrel 8. The speed control assembly comprises a power level adjust screw 1 and a speed adjusting member matched with it. The speed adjusting member comprises a snap ring 2 and a locate ring 3 fixed on the snap ring 2. Slots with different heights are uniformly provided on the side wall of the locate ring 3. The power level adjust screw 1 is composed of two speed adjusting rings with different diameters. A bulge 4 is provided on the inner side wall of the large-diameter speed adjusting ring, and the large-diameter speed adjusting ring is adapted to the locate ring 3.

The snap ring 2 and the speed adjusting ring are separately sleeved on the fastener guide assembly 9. A ring bump 16 is clamped on a step surface where the snap ring 2 and the locate ring 3 are connected. An end surface of the small-diameter speed adjusting ring is opposite to an end surface of the outer cover 13. The locate ring ng 3 corresponds to the large-diameter speed adjusting ring. It should be noted that when the speed adjusting member and the power level adjust screw are not fixed to the fastener guide assembly 9, both of them can be rotated on the fastener guide assembly 9.

When the bulge 4 needs to be inserted into the slots with different heights, the power adjustment is realized. That is, the outer cover 13 is twisted until the power level adjust screw 1 can rotate relative to the speed adjusting member, so that the bulge 4 on the power level adjust screw 1 can be inserted into different slots (the first slot 5, the second slot 6 or the third slot 7). Of course, a thread may also be provided on the inner wall of the snap ring 2, so that its circumferential contact with the ring bump 16 is connected and fixed by means of threads, and then the power level adjust screw 1 is rotated to achieve the purpose of adjusting the power.

Alternatively, the connection between the small-diameter speed adjusting ring on the power level adjust screw 1 and the side wall of the fastener guide assembly 9 is set to be connected and fixed by means of threads, and by rotating the speed adjusting member, the bulge 4 corresponds to different slots to achieve the purpose of adjusting the power. Therefore, the connection between the power level adjust screw 1 and the speed adjusting member and the fastener guide assembly 9 is not unique, and the purpose of the present invention can be achieved by adopting the above three setting manners.

A positioning ferrule assembly for positioning the fastener guide assembly 9 is provided in the circumferential direction of the outer cover 13, so as to prevent the outer cover 13 from loosening. The positioning ferrule assembly comprises a through hole provided in the circumferential direction of the outer cover 13. The through hole is on the same horizontal plane. A first ball 17 and a first spring 18 are provided in the through hole in order from the inside to the outside. A limit cover 19 is provided in the through hole and located above the first spring 18. The first ball 17 extends into the outer cover 13 and is located in an annular groove provided on the side wall of the fastener guide assembly 9.

It should be noted that several annular grooves are provided on the side wall of the fastener guide assembly 9 near its end, and the first ball 17 is partially located inside the outer cover 13 and clamped into the annular grooves. The annular grooves can play a function of vortex air-sealing, and can help increase the explosive power of nail shooting bullets. The first spring 18 is pressed against the first ball 17. The limit cover 19 has a cylindrical shape with an open end and a hollow inside. The limit cover 19 is inserted into the through hole with the opening facing down, and is in interference fit with the through hole. The first spring 18 is placed in the limit cover 19, and the first ball 17 is subjected to the force of the first spring 18, so that the first ball 17 is pressed in the annular grooves, thereby clamping the outer cover 13 and the fastener guide assembly 9 tightly.

In the inventive subject matter, views of states where the bulges are in different slots are shown in FIGS. 6 to 8, and also indicate the different powers of the nailer. The adjustment of different powers is also reflected in the distance/space between the large-sized end of the piston 12 and the air inlet of the barrel be 8. The larger the space, the smaller the power; the smaller the space, the greater the power.

Figure 9:
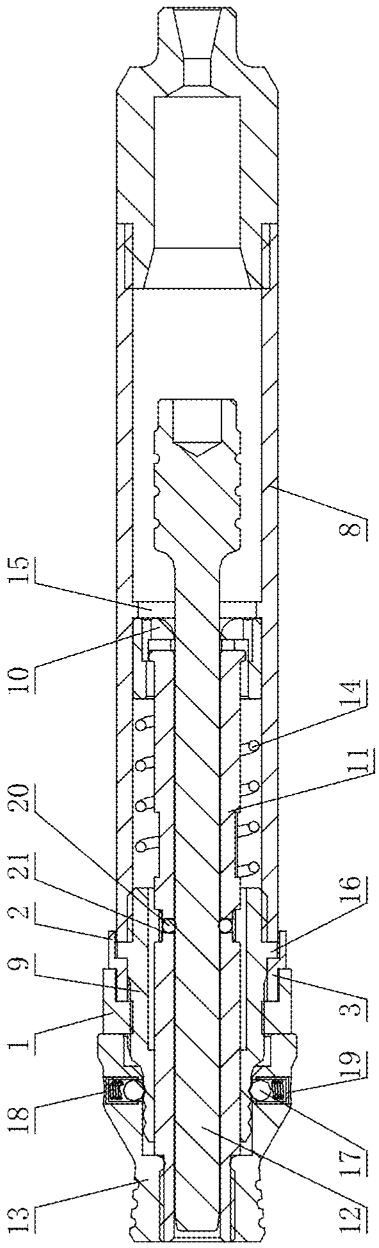
FIG. 9 is a view of a state of the speed control assembly after a nailer is fired in the state shown in FIG. 8.

When in use, a nail is loaded in the fastener guide 11, the fastener guide 11 or the outer cover 13 of the nailer is pressed onto a hard base body, and high-pressure gas generated after the nail shooting bullet explodes pushes the piston 12 to move toward the base body. As shown in FIG. 9, in this process, the second ball 20 gives way to make the piston 12 hit the nail and stop at a position close to the exit end of the fastener guide 11. The large-sized end of the piston 12 is at the large diameter of the barrel 8. The high-pressure gas generated by the explosion of the nail shooting bullet is released at the large diameter of the barrel 8 to reduce the pressure, so as to achieve the purpose of noise reduction and complete a shot.

Figure 10:
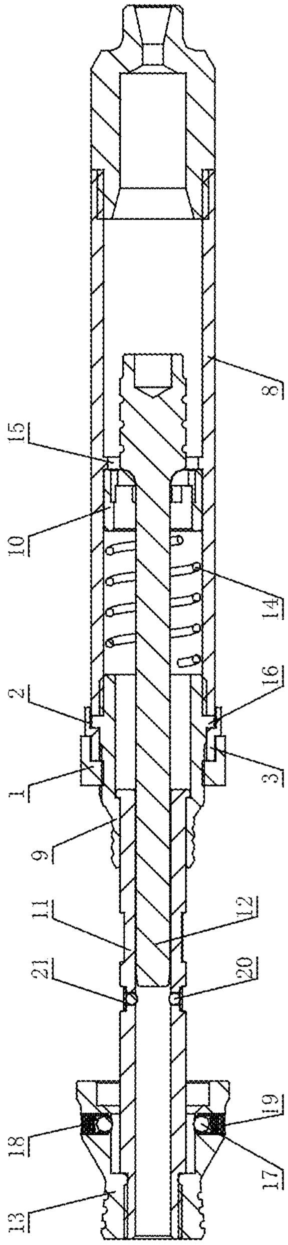
FIG. 10 is a view of a state to be reset after firing on the basis of FIG. 9.

When it is ready for the next shooting, as shown in FIG. 10, the outer cover 13 needs to be held by a hand and pulled to the left. The outer cover 13 is separated from the fastener guide assembly 9, because the outer cover 13 and the fastener guide 11 are threadedly connected to the left end as an integral piece. Therefore, the fastener guide 11 is driven to move to the left to the end, and the end surface of the fastener guide assembly 9 in the barrel 8 faces the T-shaped head of the fastener guide 11 for limiting. At the same time, if the piston 12 is driven to move to the left, then the large-sized end of the piston 12 is blocked by the reset ring 10 to ensure that when the outer cover 13 is pulled to the left in place, the second ball 20 in the middle of the fastener guide 11 separate from the piston 12.

When the outer cover 13 is held by the hand and moved to the right, the second ball 20 in the middle of the fastener guide 11 act on the tapered surface of the small-sized end of the piston 12. A U-shaped spring leaf 21 outside the second ball 20 exerts pressure on the steel ball, forcing the steel ball to push the piston 12 to the right, so as to return its large-sized end into the small-diameter section of the barrel 8. When the right large-sized end surface of the piston 12 abuts against the right end surface of the small-diameter section of the barrel 8, the initial explosion space formed is the smallest. At this time, the nailer has the maximum power. When moving to the right, the inner hole of the reset ring 10 supports the piston 12 to ensure that the large-sized end of the piston 12 enters the small diameter section of the barrel 8 without too much deviation, which is advantageous to enter the small diameter.

The distance that the outer cover 13 moves to the right is determined by the total length of the combination of the power level adjust screw 1 and the speed adjusting member, and correspondingly determines the position where the second ball 20 pushes the piston 12 to move to the right, thereby adjusting the distance between the end surface of the large-sized end of the piston 12 and the right end face of the small-diameter section of the barrel 8, adjusting the initial volume of the nail shooting bullet when it explodes and achieving the purpose of adjusting the power (see FIGS. 6 to 8).

The speed adjusting assembly of the nailer disclosed in the inventive subject matter can adjust the shooting power of the nailer for different base bodies, but the number of depths of the processing planes varies, forming a corresponding number of multi-level power adjustments. Equivalently, one or two flat nuts may be used to rotate on the outer diameter of the fastener guide assembly 9. Limiting the outer cover 13 can also achieve the purpose of adjusting the power, and the position of the rotating thread can adjust the shooting power at an infinite level, which also belongs to the scope of protection of the inventive subject matter.

If the base body is a soft base body, then the large-sized end of the piston 12 will hit the reset ring 10 and move toward the fastener guide assembly 9, playing a function of cushioning, and the reset spring 14 will be compressed. After the nail shooting operation is completed, the compressed reaction force of the reset spring 14 resets the reset ring 10, and the spring leaf 21 is subjected to the reaction force of the second ball 20, so that the second ball 20 falls back into the limiting hole again and partially extends into the fastener guide 11 to make contact with the side wall of the piston 12. At the same time, under the action of the slope of the side wall thereof and the rebound force of the piston 12 after hitting the nail, it is reset and limited.

In the inventive subject matter, with reference to FIGS. 6 to 8, the diameter of the barrel 8 is divided into two parts; one is a small-diameter section at the air inlet, and the other is a large-diameter section where the reset ring 10 is located. The change of different volumes in the barrel 8 achieves the purpose of decompressing the high-pressure gas entering the small-diameter section, and the decompressed high-pressure gas is ejected from the front end of the fastener guide 11 to produce an explosion sound, which plays a function of noise reduction. It should be noted that: in the inventive subject matter, the diameter change of the barrel 8 is divided into two sections. Of course, the diameter change of the barrel 8 may be divided into multiple sections according to actual needs, for example, barrels shown in FIG. 1 and/or FIG. 4 of Chinese Patent Application No. 201921268430.6 for utility model. Specifically, the manner of changing the internal diameter of the barrel in this patent is used, and other structures on the barrel in this patent are not provided on the barrel used in the inventive subject matter.

In the description of the inventive subject matter, it should be understood that the orientation or positional relationships indicated by the terms "longitudinal," "transverse," "upper,"

"lower," "front," "rear," "left," "right," "vertical," "horizontal," "top," "bottom," "inside," "outside" and so on are based on the orientation or positional relationships shown in the relevant figures, which is merely for the convenience of describing the inventive subject matter, and does not indicate or imply that the mentioned device or element must have a particular orientation and be constructed and operated in the particular orientation. Therefore, the above terms cannot be construed as a limitation of the inventive subject matter.

The embodiments described above are only a description of preferred modes of the inventive subject matter, and are not intended to limit the scope of the inventive subject matter. Various modifications and improvements of the technical solution of the inventive subject matter made by an ordinary person skilled in the art without departing from the design spirit of the inventive subject matter should fall within the scope of protection determined by the claims of the inventive subject matter.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A speed adjusting assembly of a noise reduction nailer, comprising:

a power level adjust screw and a speed adjusting member matched with the power level adjust screw, wherein the speed adjusting member comprises a snap ring and a locate ring fixed on the snap ring;

wherein a side wall of the locate ring comprises a plurality of slots with different heights that are uniformly provided on the side wall;

wherein the power level adjust screw comprises first and second speed adjusting rings, wherein the first speed adjusting ring has a diameter that is larger than the second speed adjusting ring;

wherein an inner side wall of the large-diameter speed adjusting ring comprises a bulge; and wherein the large-diameter speed adjusting ring is adapted to the locate ring.

2. The speed adjusting assembly of claim 1, further comprising:

wherein the plurality of slots have the same thickness, and wherein the plurality of slots are divided into a first slot, a second slot, and a third slot, wherein the first slot has a height less than half of a height of the locate ring, wherein the second slot has a height greater than half of the height of the locate ring, and wherein the third slot has a height equal to the height of the locate ring.

3. The speed adjusting assembly of claim 1, wherein a height of the large-diameter speed adjusting ring is equal to a height of the locate ring.

4. The speed adjusting assembly of claim 2, wherein a thickness of the plurality of slots is equal to a thickness of the bulge, and the bulge is disposed along the plurality of slots, so that the locate ring is inserted into the larger-diameter first speed adjusting ring.

5. The speed adjusting assembly of claim 1, wherein an outer diameter of the snap ring is the same as an outer diameter of the smaller-diameter second speed adjusting ring.

6. A noise reduction nailer, comprising:

a barrel and a fastener guide assembly screwed to the barrel, comprising:

a reset ring opened toward the fastener guide assembly disposed in the barrel;

a fastener guide with one end clamped with the reset ring and that is disposed in the barrel;

a piston extending through the reset ring into the fastener guide and that is disposed in the barrel;

wherein the other end of the fastener guide extends out of the fastener guide assembly and is screwed with an outer cover; and wherein a speed adjusting assembly is sleeved on the fastener guide assembly between the outer cover and the barrel.

7. The noise reduction nailer of claim 6, further comprising:

a reset spring that is sleeved on the fastener guide between the reset ring and the fastener guide assembly;

a stopper that is provided on an inner wall of the barrel; the reset ring abuts on the stopper; and one end of the fastener guide comprises a T-shaped head, and the reset ring is adapted to the T-shaped head, so that one end of the fastener guide is clamped in the reset ring.

8. The noise reduction nailer of claim 6, wherein the speed adjusting assembly comprises:

a power level adjust screw and a speed adjusting member matched with the power level adjust screw;

wherein the speed adjusting member comprises a snap ring and a locate ring fixed on the snap ring;

wherein a side wall of the locate ring comprises a plurality of slots with different heights that are uniformly provided on the side wall;

wherein the power level adjust screw comprises first and second speed adjusting rings, wherein the first speed adjusting ring has a diameter that is larger than the second speed adjusting ring;

wherein an inner side wall of the larger-diameter first speed adjusting ring comprises a bulge;

wherein the larger-diameter first speed adjusting ring is adapted to the locate ring;

a ring bump provided on a side wall of the fastener guide assembly;

wherein the snap ring and the first speed adjusting ring are separately sleeved on the fastener guide assembly;

wherein the ring bump is clamped on a step surface where the snap ring and the locate ring are connected;

wherein an end surface of the small-diameter speed adjusting ring is opposite to an end surface of the outer cover; and wherein the locate ring corresponds to the first speed adjusting ring.

9. The noise reduction nailer of claim 6, further comprising:

a positioning ferrule assembly for positioning the fastener guide assembly is provided in a circumferential direction of the outer cover;

the positioning ferrule assembly comprises a through hole provided in the circumferential direction of the outer cover;

a first ball and a first spring are provided in the through hole in order from inside to outside;

a limit cover is provided in the through hole and located above the first spring; and the first ball extends into the outer cover and is located in an annular groove provided on a side wall of the fastener guide assembly.

10. The noise reduction nailer of claim 6, further comprising:

a limiting member for limiting the piston is provided in the circumferential direction of the fastener guide;

the limiting member comprises a limiting hole provided in the circumferential direction of the fastener guide;

a second ball is provided in the limiting hole;

a spring leaf is provided in the limiting hole and located above the second ball; and the second ball is partially located in the fastener guide to limit the piston.

* * * * *